(12) United States Patent  
Robles-Kelly et al.

(10) Patent No.: US 8,639,038 B2  
(45) Date of Patent: Jan. 28, 2014

(54) DESCRIPTOR OF A HYPERSPECTRAL OR MULTISPECTRAL IMAGE

(75) Inventors: Antonio Robles-Kelly, Kaleen (AU); Pattaraporn Khuwuthyakorn, Dunlop (AU); Jun Zhou, Palmerston (AU)

(73) Assignee: National ICT Australia Limited, Eveleigh (AU)

( * ) Notice: Subject to any disclaimer, the term of this patent is extended or adjusted under 35 U.S.C. 154(b) by 850 days.

(21) Appl. No.: 12/818,357

(22) Filed: Jun. 18, 2010

(65) Prior Publication Data

US 2011/0311142 A1 Dec. 22, 2011

(51) Int. Cl.  
*G06K 9/46* (2006.01)

(52) U.S. Cl.  
USPC .......................................... 382/207; 382/191

(58) Field of Classification Search  
USPC ........... 382/173, 191, 207, 285, 286; 358/1.9, 358/474, 511  
See application file for complete search history.

(56) References Cited

U.S. PATENT DOCUMENTS 7,203,362 B2 * 4/2007 Sato et al. ..................... 382/173  
7,443,539 B2 * 10/2008 Komiya et al. ................ 358/1.9

* cited by examiner

*Primary Examiner* — Duy M Dang  
(74) *Attorney, Agent, or Firm* — Snell & Wilmer LLP

(57) ABSTRACT

The disclosure concerns hyperspectral and multispectral image. The disclosure concerns the computation of a descriptor for such an image. The descriptor can be used in a range of image post-processing applications, such as classification, recognition, tracking and localization. Aspects of the invention include a computer implemented method and a computer system. To computer the descriptor for a set of wavelength indexed bands, a band representation of the radiance measurements for that band based on a probability distribution function is computed 300. Then a wavelength-dependent cross-correlation between the band representations is computed 302. Finally, a descriptor based on the computed cross-correlation between the band representations is computed 304. It is an advantage that the descriptor captures a discriminative and descriptive representation of scene captured in the hyperspectral or multispectral image.

16 Claims, 13 Drawing Sheets

| Level | category | Same Scale | | Multiple Scale | |
|---|---|---|---|---|---|
| | | calibrated % | uncalibrated % | calibrated % | uncalibrated % |
| 4-Region Lattice | animals | 97.39 | 90.32 | 99.13 | 99.13 |
| | cars | 70.00 | 77.55 | 100.0 | 100.0 |
| | fluffy dolls | 83.33 | 41.49 | 90.00 | 96.67 |
| | plastic blocks | 80.00 | 96.24 | 97.14 | 97.14 |
| | wooden blocks | 96.00 | 98.74 | 99.00 | 99.00 |
| | coins | 93.75 | 87.64 | 96.88 | 96.88 |
| | average total | 91.23 | 89.47 | 97.72 | 98.54 |
| 16-Region Lattice | animals | 94.78 | 98.26 | 100.0 | 100.0 |
| | cars | 90.00 | 80.00 | 100.0 | 100.0 |
| | fluffy dolls | 80.00 | 93.33 | 96.67 | 96.67 |
| | plastic blocks | 97.14 | 94.29 | 100.0 | 97.14 |
| | wooden blocks | 100.0 | 100.0 | 99.00 | 99.00 |
| | coins | 90.63 | 93.75 | 96.88 | 96.88 |
| | average total | 94.44 | 95.91 | 99.12 | 98.83 |
| 64-Region Lattice | animals | 98.26 | 98.26 | 97.39 | 97.39 |
| | cars | 96.67 | 96.67 | 96.67 | 100.0 |
| | fluffy dolls | 80.00 | 76.67 | 90.00 | 100.0 |
| | plastic blocks | 82.86 | 82.86 | 97.14 | 94.29 |
| | wooden blocks | 100.0 | 100.0 | 100.0 | 100.0 |
| | coins | 90.63 | 90.63 | 100.0 | 96.88 |
| | average total | 94.74 | 94.44 | 97.66 | 98.25 |
| Average | | 93.47 | 93.27 | 98.17 | 98.54 |

Fig. 10

| Level | category | Single Scale | | Multiple Scale | |
|---|---|---|---|---|---|
| | | calibrated % | uncalibrated % | calibrated % | uncalibrated % |
| 4-Region Lattice | animals | 97.39 | 100.0 | 97.39 | 100.0 |
| | cars | 30.00 | 93.33 | 6.67 | 93.33 |
| | fluffy dolls | 88.57 | 97.14 | 80.00 | 97.14 |
| | plastic blocks | 56.67 | 100.0 | 53.33 | 100.0 |
| | wooden blocks | 52.00 | 98.00 | 40.00 | 98.00 |
| | coins | 65.63 | 96.88 | 31.25 | 96.88 |
| | average total | 65.04 | 97.56 | 51.44 | 97.56 |
| 16-Region Lattice | animals | 94.78 | 99.13 | 96.52 | 96.52 |
| | cars | 16.67 | 56.67 | 3.33 | 80.00 |
| | fluffy dolls | 68.57 | 94.29 | 62.86 | 88.57 |
| | plastic blocks | 13.33 | 70.00 | 20.00 | 13.33 |
| | wooden blocks | 54.00 | 100.0 | 30.00 | 94.00 |
| | coins | 18.75 | 90.63 | 3.13 | 6.25 |
| | average total | 44.35 | 85.12 | 35.97 | 63.11 |
| 64-Region Lattice | animals | 97.39 | 100.0 | 94.78 | 92.17 |
| | cars | 0.00 | 0.00 | 0.00 | 3.33 |
| | fluffy dolls | 45.71 | 54.29 | 51.43 | 65.71 |
| | plastic blocks | 0.00 | 13.33 | 0.00 | 0.00 |
| | wooden blocks | 33.00 | 98.00 | 28.00 | 93.00 |
| | coins | 0.00 | 0.00 | 0.00 | 0.00 |
| | average total | 29.35 | 44.27 | 29.04 | 42.37 |
| Average | | 46.25 | 75.65 | 38.82 | 67.68 |

Fig. 11

| Level | category | Single Scale | | Multiple Scale | |
|---|---|---|---|---|---|
| | | calibrated % | uncalibrated % | calibrated % | uncalibrated % |
| 4-Region Lattice | animals | 97.39 | 97.39 | 97.39 | 99.13 |
| | cars | 90.00 | 100.0 | 86.67 | 0.00 |
| | fluffy dolls | 90.00 | 88.57 | 100.0 | 85.71 |
| | plastic blocks | 100.0 | 100.0 | 97.14 | 96.67 |
| | wooden blocks | 99.00 | 98.00 | 99.00 | 99.00 |
| | coins | 100.0 | 96.88 | 78.13 | 96.88 |
| | average total | 96.07 | 96.81 | 93.06 | 79.56 |
| 16-Region Lattice | animals | 89.57 | 100.0 | 91.30 | 100.0 |
| | cars | 100.0 | 70.00 | 96.67 | 0.00 |
| | fluffy dolls | 63.33 | 62.86 | 100.0 | 22.86 |
| | plastic blocks | 91.43 | 100.0 | 91.43 | 76.67 |
| | wooden blocks | 100.0 | 100.0 | 99.00 | 94.00 |
| | coins | 100.0 | 100.0 | 71.88 | 81.25 |
| | average total | 90.72 | 88.81 | 91.67 | 62.46 |
| 64-Region Lattice | animals | 90.43 | 100.0 | 94.78 | 33.04 |
| | cars | 80.00 | 0.00 | 93.33 | 26.67 |
| | fluffy dolls | 76.67 | 14.29 | 90.00 | 11.43 |
| | plastic blocks | 56.67 | 0.00 | 82.86 | 26.67 |
| | wooden blocks | 100.0 | 70.00 | 92.00 | 69.00 |
| | coins | 53.13 | 96.88 | 78.13 | 90.63 |
| | average total | 76.15 | 46.86 | 88.52 | 42.91 |
| Average | | 87.65 | 77.49 | 92.37 | 47.48 |

Fig. 12

| Level | category | Single Scale | | Multiple Scale | |
|---|---|---|---|---|---|
| | | calibrated % | uncalibrated % | calibrated % | uncalibrated % |
| 4-Region Lattice | animals | 93.91 | 98.26 | 80.87 | 100.0 |
| | cars | 80.00 | 96.67 | 20.00 | 53.33 |
| | fluffy dolls | 100.0 | 100.0 | 80.00 | 91.43 |
| | plastic blocks | 70.00 | 100.0 | 3.33 | 66.67 |
| | wooden blocks | 83.00 | 100.0 | 80.00 | 97.00 |
| | coins | 93.75 | 100.0 | 6.25 | 100.00 |
| | average total | 86.78 | 99.15 | 45.08 | 84.74 |
| 16-Region Lattice | animals | 83.48 | 99.13 | 82.61 | 99.13 |
| | cars | 31.03 | 44.83 | 0.00 | 3.45 |
| | fluffy dolls | 65.71 | 80.00 | 42.86 | 51.43 |
| | plastic blocks | 6.67 | 70.00 | 0.00 | 20.00 |
| | wooden blocks | 70.00 | 99.00 | 70.00 | 98.00 |
| | coins | 28.13 | 84.38 | 3.13 | 93.75 |
| | average total | 47.50 | 79.56 | 33.10 | 60.96 |
| 64-Region Lattice | animals | 79.35 | 83.48 | 77.39 | 88.70 |
| | cars | 0.00 | 0.00 | 0.00 | 0.00 |
| | fluffy dolls | 19.29 | 17.14 | 2.86 | 5.71 |
| | plastic blocks | 0.00 | 0.00 | 0.00 | 0.00 |
| | wooden blocks | 61.25 | 84.00 | 60.00 | 67.00 |
| | coins | 0.78 | 0.00 | 3.13 | 3.13 |
| | average total | 26.78 | 30.77 | 23.90 | 27.42 |
| Average | | 53.69 | 69.83 | 34.03 | 57.72 |

Fig. 13

DESCRIPTOR OF A HYPERSPECTRAL OR MULTISPECTRAL IMAGE

TECHNICAL FIELD

The disclosure concerns hyperspectral and multispectral image. The disclosure concerns the computation of a descriptor for such an image. The descriptor can be used in a range of image post-processing applications, such as classification, recognition, tracking and localisation. Aspects of the invention include a computer implemented method and a computer system.

BACKGROUND ART

With the advent and development of new sensor technologies, it is now possible to capture image data in tens or hundreds of wavelength-resolved bands covering a broad spectral range. Compared to traditional monochrome and trichromatic cameras, hyperspectral image sensors provide an information-rich representation of the spectral response for the material under study over a number of wavelengths. This has opened-up great opportunities and posed important challenges due to the high dimensional nature of the spectral data.

The use of local image descriptors opens-up great opportunities in recognition and classification tasks. Moreover, the multidimensional nature of local image features and descriptors may be combined to improve performance.

Any discussion of documents, acts, materials, devices, articles or the like which has been included in the present specification is solely for the purpose of providing a context for the present disclosure. It is not to be taken as an admission that any or all of these matters form part of the prior art base or were common general knowledge in the field relevant to the present disclosure as it existed before the priority date of each claim.

SUMMARY

In a first aspects there is provided a computer implemented method for computing a descriptor of a hyperspectral or multispectral image comprised of wavelength indexed radiance measurements, comprising:

for a set of wavelength indexed bands, computing a band representation of the radiance measurements for that band based on a probability distribution function;

computing a wavelength-dependent cross-correlation between the band representations; and computing a descriptor based on the computed cross-correlation between the band representations.

It is an advantage that the descriptor captures a discriminative and descriptive representation of scene captured in the hyperspectral or multispectral image that find application in a range of image processing methods. It is an advantage that the transformed bands also provide a compact representation of the image making it easier computation in post analysis as opposed to the whole image.

A band may include one or more wavelength indexes.

Computing a band representation may be based on one or more probability distribution functions.

The probability distribution function may have a long and/or heavy tail.

Computing a band representation based on a probability distribution function may be further based on a harmonic kernel or function. It is an advantage of at least one embodiment that the use of harmonic analysis permits the use of the descriptor in the context of Hilbert spaces.

The harmonic function or kernel may be one or more of:
Mellin
Hankel
Cosine, and
Eigenvalues and eigenvectors.

The method may further comprise using the descriptor in post processing of the image, where the harmonic function or kernel used is based on the type of post processing to be performed. For example, one would use a cosine function for purposes of compression and a Fourier kernel for the computation of a descriptor robust to noise.

The method may further comprise removing distortion from the harmonic function or kernel induced by geometric transformations of the image as represented in the band representations. Removing distortion may include determining the relationship between the geometric transformations over locally planar patches on the surfaces in the scene captured in the image and its effect on the band representations. It is an advantage of at least one embodiment that this makes the resulting descriptor affine invariant, such as invariant to the geometric distortions on the object surface plane.

Computing the cross-correlation may comprise an approximation over the band representations based on a probability distribution function. The approximation over the band representations may be further based on a harmonic function or kernel.

Where distortion is removed, computing the cross-correlation may comprise an approximation over the band representations having distortion removed and based on a further probability distribution function.

The descriptor may comprise a vector whose elements correspond to the cross-correlation between the band representations.

Computing the band representations and cross-correlation may be performed on multiple regions of the image.

The method may further comprise using the descriptor in post processing of the image. Post-processing of the image may include one or more of:
image editing;
recognition;
classification, and
localisation.

It is an advantage of at least one embodiment that the descriptor is able to take account the local structure of the images under study.

In a second aspect there is provided a computer system to compute a descriptor of a hyperspectral or multispectral image comprised of wavelength indexed radiance measurements, comprising:
a processor to compute:
for a set of wavelength indexed bands, a band representation of the radiance measurements for that band based on a probability distribution function,
a wavelength-dependent cross-correlation between the band representations, and
a descriptor based on the computed cross-correlation between the band representations; and
output means to provide output of the descriptor or storage means to store the descriptor. The output may be to another computer or other component of the computer system. The storage may be volatile or non-volatile storage.

It is an advantage that the band representations also provide a compact representation of the image making it easier computation in post analysis as opposed to the whole image.

BRIEF DESCRIPTION OF THE DRAWINGS

Example(s) of the invention will now be described with reference to the accompanying drawings in which:

FIG. 10 is table 1.1 that shows image categorisation results as percentage of correctly classified items in the dataset using the nearest neighbour classifier and our descriptor.

FIG. 11 is table 1.2 that shows image categorisation results as percentage of correctly classified items in the dataset using a nearest neighbour classifier and an LBP-based descriptor.

FIG. 12 is table 1.3 that shows image categorisation results as percentage of correctly classified items in the dataset using and SVM with an RBF kernel and our descriptor.

FIG. 13 is table 1.4 that shows image categorisation results as percentage of correctly classified items in the dataset using and SVM with an RBF kernel and the LBP descriptor.

BEST MODES

Figure 1:
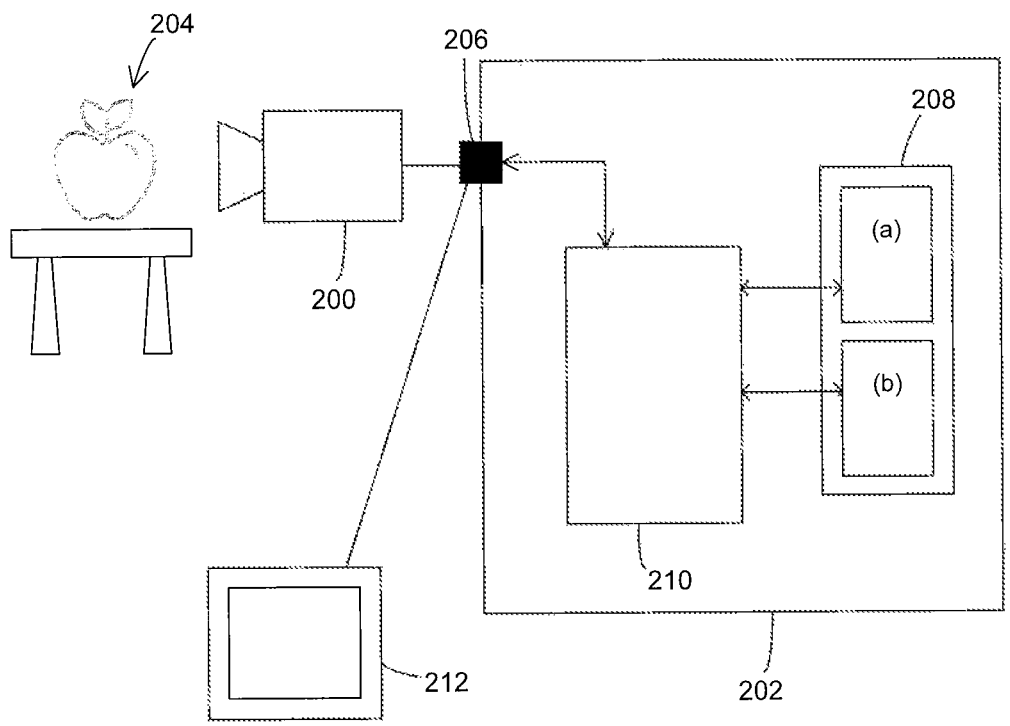
FIG. 1 is an example computer system able to implement the method of determining described.

This example computes a hyperspectral image descriptor by using harmonic functions to model hyperspectral imagery in terms of probability distributions. This is reminiscent of time-dependent textures, whose probability density functions exhibit first and second order moments which are space and time-shift invariant [9].

We relate hyperspectral image regions to harmonic kernels to capture a discriminative and descriptive representation of the scene. This provides a principled link between statistical approaches and signal processing methods for texture recognition to shape modeling approaches based upon measures of spectral distortion [25]. The method also provides a link to affine geometric transformations between texture planes and their analysis in the Fourier domain [4].

We commence by exploring the link between harmonic analysis and heavy tailed distributions. We then explore the relationship between distortions over locally planar patches on the object surface as captured in the image and the domain induced by an integral transform over a harmonic kernel. We do this so as to achieve invariance to affine transformations on the image plane. With these technical foundations at hand, we proceed to present our hyperspectral image descriptor by incorporating the cross-correlation between bands. This results in a descriptor based upon orthogonal bases with high information compaction properties which can capture the space and wavelength correlation for the spectra in hyperspectral images. Moreover, as we show later on, the choice of bases or kernel is quite general since it applies to harmonic kernels which span a Hilbert space. We conclude by demonstrating the utility of our descriptor for purposes of object recognition based upon real-world hyperspectral imagery.

Heavy-Tailed Distributions

As mentioned earlier, we view hyperspectral images as arising from a probability distribution whose observable or occurrences may have long or heavy tails. This implies that the spectra in the image results in values that can be rather high in terms of their deviation from the image-spectra mean and variance. As a result, our formulation can capture high wavelength-dependent variation in the image. This is important, since it allows us to capture information in our descriptor that would otherwise may be cast as the product of outliers. Thus, we formulate our descriptor so as to model "rare" stationary wavelength-dependent events on the image plane.

Moreover, we view the pixel values of the hyperspectral image as arising from stochastic processes whose moment generating functions are invariant with respect to shifts in the image-coordinates. This means that the mean, covariance, kurtosis, etc. for the corresponding joint probability distribution are required to be invariant with respect to changes of location on the image. Due to our use of heavy tailed distributions, these densities may have high dispersion and, thus, their probability density functions are, in general, governed by further-order moments. This introduces a number of statistical "skewness" variables that allow modelling high variability spectral behaviour.

This is reminiscent of simulation approaches where importance sampling cannot be effected via an exponential changes in measurement due to the fact that the moments are not exponential in nature. This applies to distributions such as the log-normal, Weibull with increasing skewness and regularly varying distributions such as Pareto, stable and log-gamma distributions [2]. More formally, we formulate the density of the pixel-values for the wavelength $\lambda$ at the pixel $\mu$ in the image-band $I_\lambda$ of the image as random variables $\mathcal{Y}_u$ whose inherent basis $\mathcal{X}_u = \{x_u(1), x_u(2), \ldots, x_u(|\mathcal{X}_u|)\}$ is such that $$P(\mathcal{Y}_u) = \sum_{k=1}^{|\mathcal{X}_u|} P(x_u(k)) \quad (1.1)$$

where, $x_u(k)$ are identically distributed variables and, as usual for probability distributions of real-valued variables, we have written $P(\mathcal{Y}_u) = \Pr[y \leq \mathcal{Y}_u]$ for all $y \in \mathfrak{R}$..

In other words, we view the pixel values for each band in the image under study as arising from a family of heavy-tailed distributions whose variance is not necessarily finite. It is worth noting that, for finite variance, the formalism above implies that P($\mathcal{B}_u$) is normally distributed and, as a result, our approach is not exclusive to finite variance distributions, but rather this treatment generalises the stochastic process to a number of independent influences, each of which is captured by the corresponding variable $x_u(k)$.

In practice, the Probability Density Function (PDF) $f(\mathcal{B}_u)$ is not available in close form. As a result, we can re-parameterise the PDF by recasting it as a function of the variable $\zeta$ making use of the characteristic function $$\psi(\varsigma) = \int_{-\infty}^{\infty} \exp(i\varsigma\mathcal{B}_u) f(\mathcal{B}_u) d\mathcal{B}_u \qquad (1.2)$$

$$= \exp(iu\varsigma - \gamma|\varsigma|^\alpha (1 + i\beta\mathrm{sign}(\varsigma)\varphi(\varsigma, \alpha))) \qquad (1.3)$$

where $i=\sqrt{-1}$, u is, as before, the pixel-index on the image plane and $\gamma \in \mathfrak{R}.+$ are function parameters, $\beta \in [-1,1]$ and $\alpha \in (0,2]$ are the skewness and characteristic exponent, respectively, and $\phi(\bullet)$ is defined as follows $$\varphi(\varsigma, \alpha) = \begin{cases} \tan\left(\alpha\frac{\pi}{2}\right) & \text{if } \alpha \neq 1 \\ -\frac{\pi}{2}\log|\varsigma| & \text{if } \alpha = 1 \end{cases} \qquad (1.4)$$

For the characteristic function above, some values of α correspond to special cases a 2 of the distribution. For instance, α=implies a normal distribution, β=0 and α=1 corresponds to a Cauchy distribution and, for the Levy distribution we have α=½ and β=1. Thus, nonetheless the formalism above can capture a number of cases in exponential families, it is still quite general in nature so as to allow the modeling of a large number of distributions that may apply to hyperspectral data and whose characteristic exponents α are not of those distributions whose tails are exponentially bounded.

So far, we have limited ourselves to the image plane for a fixed wavelength λ. That is, we have, so far, concentrated on the distribution of spectral values across every wavelength-resolved band in the image. Note that, without loss of generality, we can extend Equation (1.3) to the wavelength domain, i.e. the spectra of the image across a segment of bands.

This is a straightforward task by noting that the equation above can be viewed as the cross-correlation between the function $f(\mathcal{B}_u)$ and the exponential given by $\exp(i\varsigma\mathcal{B}_u)$. Hence, we can write the characteristic function for the image parameterised with respect to the wavelength λ as follows $$\vartheta(\lambda) = \int_{-\infty}^{\infty}\int_{-\infty}^{\infty} \exp(i\lambda\varsigma)\exp(i\varsigma\mathcal{B}_u) f(\mathcal{B}_u) d\mathcal{B}_u d\varsigma \qquad (1.5)$$

$$= \int_{-\infty}^{\infty} \exp(i\lambda\varsigma)\psi(\varsigma) d\varsigma \qquad (1.6)$$

where the second line in the equation above corresponds to the substitution of Equation (1.3) into Equation (1.5).

Equation (1.6) captures the spectral cross-correlation for the characteristic functions for each band. In this manner, we view the characteristic function for the hyperspectral image as a heavy-tailed distribution of another set of heavy-tailed PDFs, which correspond to each of the band in the image. This can also be interpreted as a composition of two heavy-tailed distributions, where Equation (1.3) corresponds to the image-band domain $\zeta$ of the image and Equation (1.6) is determined by the wavelength-dependent domain λ.

This composition operation suggests a two-step process for the computation of the image descriptor. This is shown in flow chart of FIG. 2.

Firstly, at the band-level 300, the information can be represented in a compact fashion making use of harmonic analysis. At this step it can also optionally be rendered invariant to geometric distortions on the object surface plane.

Secondly, the wavelength-dependent correlation 302 between bands can be computed making use of the operation in Equation (1.6).

Finally, the these computer correlation are used to compute 304 a final descriptor for the image.

Harmonic Analysis

In this section, we explore the use of harmonic analysis and the fundamentals of integral transforms [40] to provide a means to the computation of our image descriptor. We commence by noting that Equation (1.2) and Equation (1.5) are characteristic functions obtained via the integral of the product of the function $g(\eta)$ i.e. $f(\mathcal{B}_u)$ and $\psi(\zeta)$, multiplied by a kernel, given by $\exp(i\lambda\zeta)$ and $\exp(i\zeta\mathcal{B}_u)$, respectively.

To appreciate this more clearly, consider the function given by $$F(\omega) = \int_{-\infty}^{\infty} g(\eta) K(\omega, \eta) d\eta \qquad (1.7)$$

where $K(\omega, \eta)$ is a harmonic kernel of the form $$K(\omega, \eta) = \sum_{k=1}^{\infty} a_k \phi_k(\omega)\phi_k(\eta) \qquad (1.8)$$

where $a_k$ is the $k^{th}$ real scalar corresponding to the harmonic expansion and $\phi_k(\bullet)$ are orthonormal functions such that $\langle \phi_k(\omega), \phi_n(\eta)\rangle = 0 \forall n \neq k$. Moreover, we consider cases in which the functions $\phi_k(\bullet)$ constitute a basis for a Hilbert space [44] and, therefore, the right-hand side of Equation (1.8) is convergent to $K(\omega, \eta)$ as k tends to infinity.

To see the relation between Equation (1.7) and the equations in previous sections, we can examine $\psi(\zeta)$ in more detail and write $$\log[\psi(\varsigma)] = iu\varsigma - \gamma|\varsigma|^\alpha(1 + i\beta\mathrm{sign}(\varsigma)\varphi(\varsigma, \alpha)) \qquad (1.9)$$

$$= iu\varsigma - |\varsigma|^\alpha \gamma^{*\alpha} \exp\left(-i\beta^* \frac{\pi}{2}\vartheta\mathrm{sign}(\varsigma)\right) \qquad (1.10)$$

where $\vartheta = 1 - |1 - \alpha|$ and parameters $\gamma^*$ and $\beta^*$ are given by $$\gamma^* = \left(\frac{\gamma\sqrt{\Omega}}{\cos\left(\alpha\frac{\pi}{2}\right)}\right)^{\frac{1}{\alpha}} \qquad (1.11)$$

$$\beta^* = \frac{2}{\pi\vartheta}\arccos\left(\frac{\cos\left(\alpha\frac{\pi}{2}\right)}{\sqrt{\Omega}}\right) \qquad (1.12)$$

and $$\Omega = \cos^2\left(\alpha\frac{\pi}{2}\right) + \beta^2\sin^2\left(\alpha\frac{\pi}{2}\right).$$

To obtain the kernel for Equation (1.7), we can use Fourier inversion on the characteristic function and, making use of the shorthands defined above, the PDF may be computed via this following equation.

$$f(\mathcal{B}_u; u, \beta^*, \gamma^*, \alpha) = \quad (1.13)$$

$$\frac{1}{\pi \gamma^*} \int_0^\infty \cos\left(\frac{(u-\mathcal{B}_u)s}{\gamma^*} + s^\alpha \sin(\phi)\right) \exp(-s^\alpha \sin(\phi)) ds$$

where $\phi = \frac{\beta^* \pi \eta}{2}$.

This treatment not only opens-up the possibility of functional analysis on the characteristic function using the techniques in the Fourier domain, but also allows the use of other harmonic kernels for compactness and ease of computation. This is due to the fact that, we can view the kernel $K(\omega, \eta)$ as the exponential exp $(-s^\alpha \sin(\phi))$, whereas the function $g(\eta)$ is given by the cosine term. Thus, we can use other harmonic kernels so as to induce a change of basis without any loss of generality. Actually, the expression above can be greatly simplified making use of the shorthands $$A = \frac{(u-\mathcal{B}_u)}{\gamma^*},$$

$\eta = s^\alpha$ and $\omega \eta = As + s^\alpha \sin(\phi)$, which yields $$s^\alpha \sin(\phi) = \omega \eta - A \eta^{\frac{1}{\alpha}} \quad (1.14)$$

Substituting Equation (1.13) with Equation (1.14), the PDF can be expressed as $$f(\mathcal{B}_u; u, \beta^*, \gamma^*, \alpha) = \sqrt{\frac{2}{\pi}} \int_0^\infty \frac{\exp\left(-\omega \eta + A \eta^{\frac{1}{\alpha}}\right)}{\sqrt{2\pi} \, \gamma^* \alpha \eta^{\left(\frac{\alpha-1}{\alpha}\right)}} \cos(\omega \eta) d\eta \quad (1.15)$$

where the kernel then becomes $$K(\omega, \eta) = \cos(\omega \eta) \quad (1.16)$$

This can be related, in a straightforward manner, to the Fourier cosine transform (FCT) of the form $$F(\omega) = \sqrt{\frac{2}{\pi}} \int_0^\infty \frac{\exp\left(-\omega \eta + \frac{(u-\mathcal{B}_u)}{\gamma^*} \eta^{\frac{1}{\alpha}}\right)}{\sqrt{2\pi} \, \gamma^* \alpha \eta^{\left(\frac{\alpha-1}{\alpha}\right)}} \cos(\omega \eta) d\eta \quad (1.17)$$

which is analogous to the expression in Equation (1.13). Nonetheless, the transform above does not have imaginary coefficients. This can be viewed as a representation in the power rather than in the phase spectrum. Moreover, it has the advantage of compacting the spectral information in the lower-order Fourier terms, i.e. those for which $\omega$ is close to the origin. This follows the strong "information compaction" property of FCTs introduced in [34] and assures a good trade-off between discriminability and complexity.

It is worth stressing that, due to the harmonic analysis treatment given to the problem in this section, other kernels may be used for purposes of computing other integral transforms [40] spanning Hilbert Spaces. These include wavelets and the Mellin ($K(\omega, \eta) = \eta^{\omega-1}$) and Hankel transforms. In fact, other Kernels may be obtained by performing an appropriate substitution on the term $\cos(\omega \eta)$. Note that, for purposes of our descriptor recovery, we will focus on the use of the cosine transform above. This is due to the information compaction property mentioned earlier and the fact that computational methods for the efficient recovery of the FCT are readily available.

Invariance to Affine Distortions

Having introduced the notion of the harmonic analysis and shown how the probability density function can be recovered using a Fourier transform, we now focus on relation between distortions on the object surface plane and the Fourier domain. To this end, we follow [4] and relate the harmonic kernel above to affine transformations on the object locally planar shape. As mentioned earlier, the function $f(\mathcal{B}_u)$ corresponds to the band-dependent component of the image and, as a result, its prone to affine distortion. This hinges in the notion that a distortion on the object surface will affect the geometric factor for the scene, but not its photometric properties. In other words, the material index of refraction, roughness, etc. remains unchanged, whereas the geometry of the reflective process does vary with respect to affine distortions on the image plane. The corresponding 2D integral transform of the function $f(\mathcal{B}_u)$ which, as introduced in the previous sections, corresponds to the pixel values for the image-band $I_\lambda$ in the image under study is given by $$F(\xi) = \int_\Gamma f(\mathcal{B}_u) K(\xi^T, u) du \quad (1.18)$$

where $u = [x, y]^T$ is the vector of two-dimensional coordinates for the compact domain $\delta \in \mathfrak{R}^2$ and, in the case of the FCT, $K(\xi^T, u) = \cos(2\pi(\xi^T u))$.

In practice, the coordinate-vectors u will be given by discrete quantities on the image lattice. For purposes of analysis, we consider the continuous case and note that the affine coordinate transformation can be expressed in matrix notation as follows $$u' = \begin{bmatrix} x' \\ y' \end{bmatrix} = \begin{bmatrix} a & b \\ d & e \end{bmatrix} \begin{bmatrix} x \\ y \end{bmatrix} + \begin{bmatrix} c \\ f \end{bmatrix} \quad (1.19)$$

This observation is important because we can relate the kernel for the FCT in Equation (1.18) to the transformed coordinate $u' = [x', y']^T$. Also, note that, for patches centered at keypoints in the image, the locally planar object surface patch can be considered devoid of translation. Thus, we can set $c = f = 0$ and write $$\xi^T u = \xi^T \begin{bmatrix} x \\ y \end{bmatrix} \quad (1.20)$$

$$= [\xi_x \ \xi_y] \begin{bmatrix} a & b \\ d & e \end{bmatrix}^{-1} \begin{bmatrix} x' \\ y' \end{bmatrix} \quad (1.21)$$

$$= \frac{1}{ae - bd} [(e\xi_x - d\xi_y) \ (-b\xi_x + a\xi_y)] \begin{bmatrix} x' \\ y' \end{bmatrix} \quad (1.22)$$

where $\xi=[\xi_x,\xi_y]^T$ is the vector of spectral indexes for the 2D integral transform.

Hence, after some algebra, and using the shorthand $\Delta=(ae-bd)$, we can show that for the coordinates u', the integral transform is given by $$F(\xi) = \frac{1}{|\Delta|}\int_{-\infty}^{\infty}\int_{-\infty}^{\infty} f(\mathcal{Y}_{u'})K\left(\frac{1}{\Delta}[(e\xi_x - d\xi_y), (b\xi_x - a\xi_y)],\right.$$

$$\left.[x',y']^T\right)dx'dy' \quad (1.23)$$

This implies that $$F(\xi) = \frac{1}{|\Delta|}F(\xi') \quad (1.24)$$

where $\xi'$ the "distorted" analogue of $\xi$. The distortion matrix $\mathbb{T}$ is such that $$\xi = \begin{bmatrix}\xi_x\\\xi_y\end{bmatrix} = \begin{bmatrix}a & d\\b & e\end{bmatrix}\begin{bmatrix}\xi'_x\\\xi'_y\end{bmatrix} = \mathbb{T}\xi' \quad (1.25)$$

As a result, from Equation (1.23), we can conclude that the effect of the affine coordinate transformation matrix $\mathbb{T}$ is to produce a distortion equivalent to $(\mathbb{T}^T)^{-1}$ in the $\xi$ domain for the corresponding integral transform. This observation is an important one since it permits achieving invariance to affine transformations on the locally planar object surface patch. This can be done in practice via a $\xi$-domain distortion correction operation of the form $$F(\xi)=(\mathbb{T}^T)^{-1}F(\xi') \quad (1.26)$$

Descriptor Construction

With the formalism presented in the previous sections, we now proceed to elaborate further on the descriptor computation. Succinctly, this is a two-step process.

Firstly, we compute 300 (FIG. 2) the affine-invariant 2D integral transform for every band in the hyperspectral image under study. This is equivalent to computing the band-dependent component of the characteristic function $\psi(\zeta)$.

Secondly, we capture 304 (FIG. 2) the wavelength dependent behaviour of the hyperspectral image by computing the cross-correlation with respect to the spectral domain for the set of distortion-invariant integral transforms.

By making use of the FCT kernel, in practice, the descriptor becomes an FCT with respect to the band index for the cosine transforms corresponding to wavelength-resolved image in the sequence.

Following the rationale above, we commence by computing the distortion invariant integral transform for each band in the image. To do this, we use Equation (1.26) to estimate the distortion matrix with respect to a predefined reference. Here, we employ the peaks of the power spectrum and express the relation of the integral transforms for two locally planar image patches, i.e. the one corresponding to the reference and that for the object under study. We have done this following the notion that a blob-like shape composed of a single transcendental function on the image plane would produce two peaks in the Fourier domain. That is, we have set, as our reference, a moment generating function arising from a cosine on a plane perpendicular to the camera.

Let the peaks of the power spectrum for two locally planar object patches, A and B, be given by $U_A$ and $U_B$. Those for the reference R are $U_R$. The affine distortion matrices are $\mathbb{T}_A$ and $\mathbb{T}_B$ respectively. As a result, the matrices A, B and $U_R$ are such that each of their columns correspond to the x-y coordinates for one of the two peaks in the power spectrum. These relations are given by $$U_A=(\mathbb{T}_A^T)^{-1}U_R \quad (1.27)$$

$$U_B=(\mathbb{T}_B^T)^{-1}U_R \quad (1.28)$$

where $\mathbb{T}_A:R\Rightarrow A$ and $\mathbb{T}_B:R\Rightarrow B$ and are the affine coordinate transformation matrices of the planar surface patches under consideration in spatial domain.

Note that, this is reminiscent of the shape-from-texture approaches hinging in the use of the Fourier transform for the recovery of the local distortion matrix [35]. Nonetheless, in [35], the normal is recovered explicitly making use of the Fourier transform, whereas here we employ the integral transform and aim at relating the FCTs for the two locally planar patches with that of the reference. We can do this making use of the composition operation given by $$U_B=(\mathbb{T}_A\mathbb{T}_B^{-1})^T U_A \quad (1.29)$$

$$U_B=\Phi_{BA}U_A \quad (1.30)$$

where $\Phi_{BA}=(\mathbb{T}_A\mathbb{T}_B^{-1})^T$ is the matrix representing the distortion of the power spectrum of $U_A$ with respect to $U_B$. Here, we use the shorthands $\mathbb{T}_A^T=U_RU_A^{-1}$ and $(\mathbb{T}_B^T)^{-1}=U_BU_R^{-1}$ to write $$\Phi_{BA}=(U_RU_A^{-1})(U_BU_R^{-1}) \quad (1.31)$$

Figure 3:
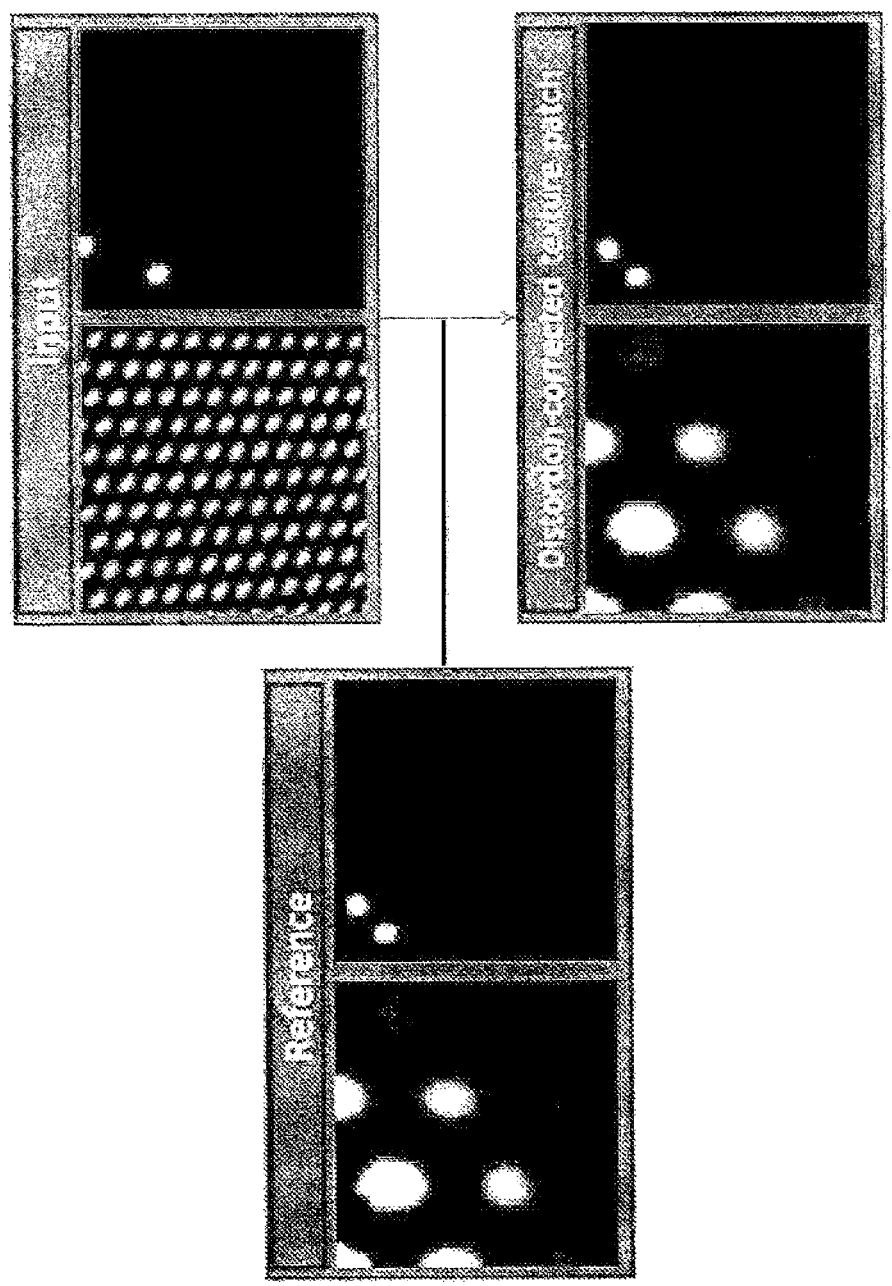
FIG. 3 shows example reference, input and distortion corrected single-band textures. In the panels, the left-hand image shows the single-band reference texture whereas the right-hand panel shows the power spectrum of the distorted and affine corrected FCT for the texture being processed.

As a result, we fix a reference for every locally planar patch so as to compute the matrix $\Phi$ directly through the expression above. This contrasts with other methods in the fact that, for our descriptor computation, we do not recover the principal components of the local distortion matrix, but rather construct a band-level matrix of the form $$V=[F(I_1)^* |F(I_2)^*| \ldots |F(I_{|II|})^*] \quad (1.32)$$

which is the concatenation of the affine invariant integral transforms $F(\bullet)^*$ for the band-resolved locally planar object surface patches in the image. Moreover, we render the band-level integral transform invariant to affine transformations making use of the reference peak matrix $U_R$ such that the transform for the band indexed t is given by $$F(I_R)=F(I_t)^*\Phi_t^{-1} \quad (1.33)$$

where $\Phi_t^{-1}$ is the matrix which maps the transform for the band corresponding to the wavelength $\lambda$ to the transform $F(I_R)$ for the reference plane. Here, as mentioned earlier, we have used as reference the power spectrum given by two peaks rotated 45° about the upper left corner of the 2D FCT. The reference FCT is shown in FIG. 3.

Note that, since we have derived our descriptor based upon the properties of integral transforms and Hilbert spaces, each element of the matrix V can be considered as arising from the inner product of a set of orthonormal vectors. Moreover, from a harmonic analysis perspective, the elements of V are represented in terms of discrete wave functions, over an infinite number of elements [19]. This is analogue to the treatment given to time series in signal processing, where the variance of the signal is described based upon spectral density. Usually, the variance estimations are performed by using Fourier transform methods [41]. Thus, we can make use of the discrete analogue of Equation (1.6) so as to recover the $k^{th}$ coefficient for the image descriptor $\mathfrak{G}$, which becomes $$\mathfrak{G}_k = F(V) = \sum_{n=0}^{|\mathbb{I}|-1} F(I_n)^* K\left(\frac{\pi}{|\mathbb{I}|}\left(n+\frac{1}{2}\right), \left(k+\frac{1}{2}\right)\right) \quad (1.34)$$

where $|\mathfrak{G}|=|\mathbb{I}|$ and, for the FCT, the harmonic kernel above becomes $$K\left(\frac{\pi}{|\mathbb{I}|}\left(n+\frac{1}{2}\right), \left(k+\frac{1}{2}\right)\right) = \cos\left(\frac{\pi}{|\mathbb{I}|}\left(n+\frac{1}{2}\right)\left(k+\frac{1}{2}\right)\right) \quad (1.35)$$

Example Implementation

In this example, we have an image of an apple on a table that we wish to recognise.

A computer system shown on FIG. 1 will perform this analysis. This computer system comprises a sensor 200 and a computer 202. In this example the sensor 200 is a hyperspectral camera that is able to capture an image of a scene 204, in this case the apple sitting on a table.

Figure 2:
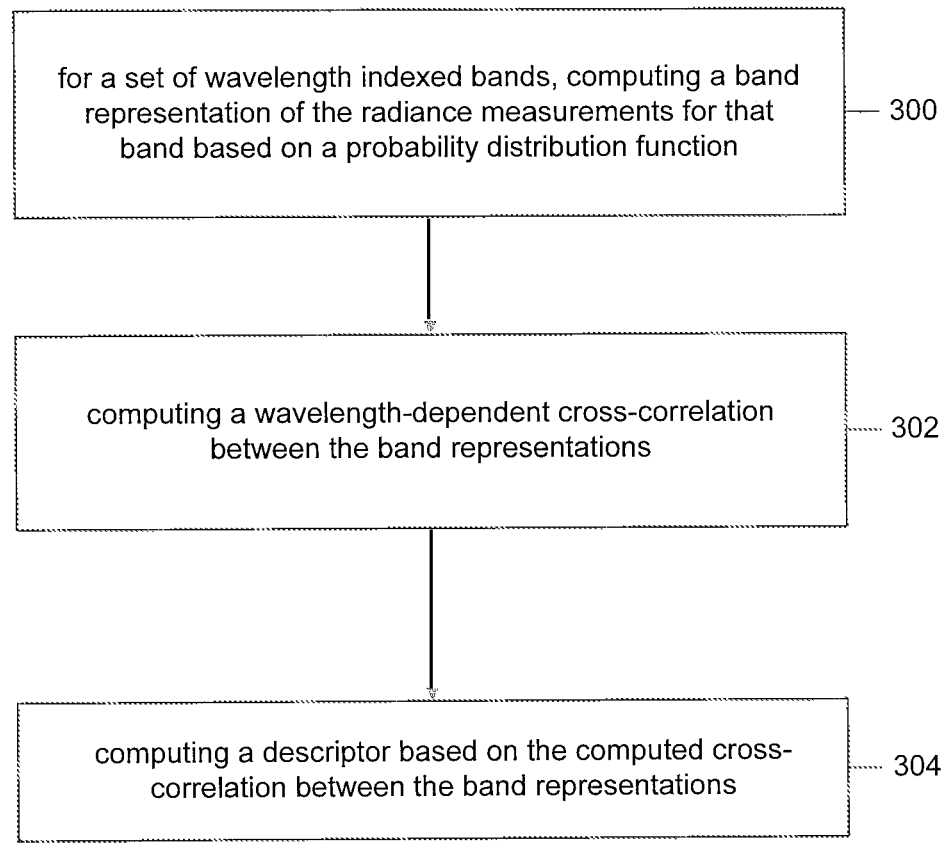
FIG. 2 is a simplified flowchart of a method of determining a descriptor of a multispectral or hyperspectral image.

Software is stored in memory 208(a) which the processor 210 uses to be able to perform the method shown in FIG. 2.

The memory 208(a) and 208(b) is a machine-readable medium which includes any mechanism that provides (i.e. stores and/or transmits) information in a form readable by a machine (e.g. a computer). For example, a machine-readable medium includes read only memory (ROM), random access memory (RAM), magnetic disk storage media, optical storage media, flash memory devices, electrical, optical, acoustical, or other form of propagated signals (e.g. carrier waves, infrared signals, digital signals).

The software provides a user interface that can be presented to the user on a monitor 212. The user interface is able to accept input from the user, such as the type of post processing required, in this case recognition. It may also accept input from the user on which harmonic function or kernal that they wish to use, alternatively this may be automatically selected by the software.

The user input is provided to the input/out port 206 by the monitor 212. The received image is stored in memory 208(b) by the processor 210. In this example the memory 208(b) is local to the computer 202, but alternatively could be remote to the computer 202.

The processor 210 then performs the computations as above, see for example FIG. 2.

The processor 210 also causes a descriptor to be presented on the user interface if appropriate.

The descriptor is then stored in memory 208(b) or is provided as output 206 to another computer system.

In this example the memory 208(b) also stores descriptors of a database comprised of records having a reference image, a descriptor for the reference image and a description of the reference image. The processor 210 operates to compare the computed descriptor to the reference images in the database so as to identify a reference image that is most similar descriptor. Having identified the most similar reference descriptor the processor 210 operates to retrieve from memory the image and image description associated with that reference image descriptor and cause it to be displayed on the monitor 212.

It will be appreciated that a range of image post processing applications can be used with the computed descriptor, including recognition and classification tasks. Examples of these tasks include:

face detection,
face recognition,
medical diagnosis, and
material classification In other examples the method described here of computing a descriptor may be computed by a computer system that forms part of the camera 200 itself. The computer is simply any device having the processing capability to perform the invention described.

Further implementation will now be described with more detail.

Figure 4:
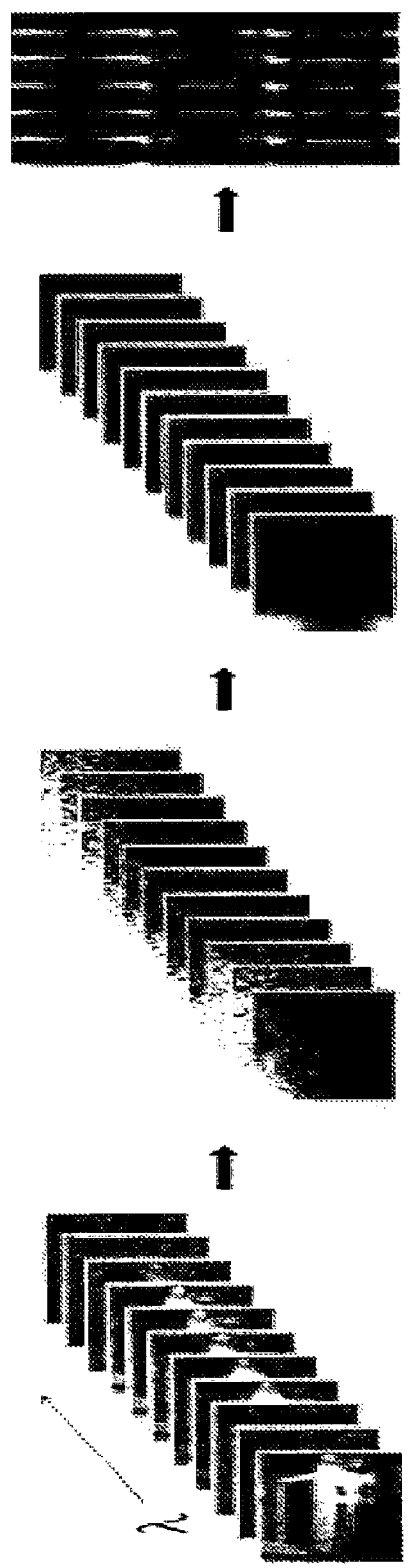
FIG. 4 schematically shows as images the method of this example. From left-to-right: hyperspectral texture, the band-wise FCT, the distortion invariant cosine transforms for every band in the image and the raster scanned 3D matrix V.

We illustrate, in FIG. 4, the step-sequence of the descriptor computation procedure. We depart from a series of bands in the image and compute the band-by-band FCT. With the band FCTs at hand, we apply the distortion correction approach presented in the previous sections so as to obtain a "power-aligned" series of cosine transforms that can be concatenated into V. The descriptor is then given by the cosine transform of V over the wavelength-index. Note that the descriptor will be three-dimensional in nature, with size $N_x \times N_y \times N_\lambda$, where $N_x$ and $N_y$ are the sizes of the locally planar object patches in the image lattice and $N_\lambda$ is equivalent to the wavelength range for the hyperspectral image bands. In the figure, for purposes of visualisation, we have raster-scanned the descriptor so as to display a 2D matrix whose rows correspond to the wavelength-indexes of the hyperspectral image under study.

We now illustrate the distortion correction operation at the band level in FIG. 3. In the panels, we show the reference, corrected and input image regions in their spatial and frequency domains. Note that, at input, the textured planes show an affine distortion which affects the distribution of the peaks in its power spectrum.

Figure 5:
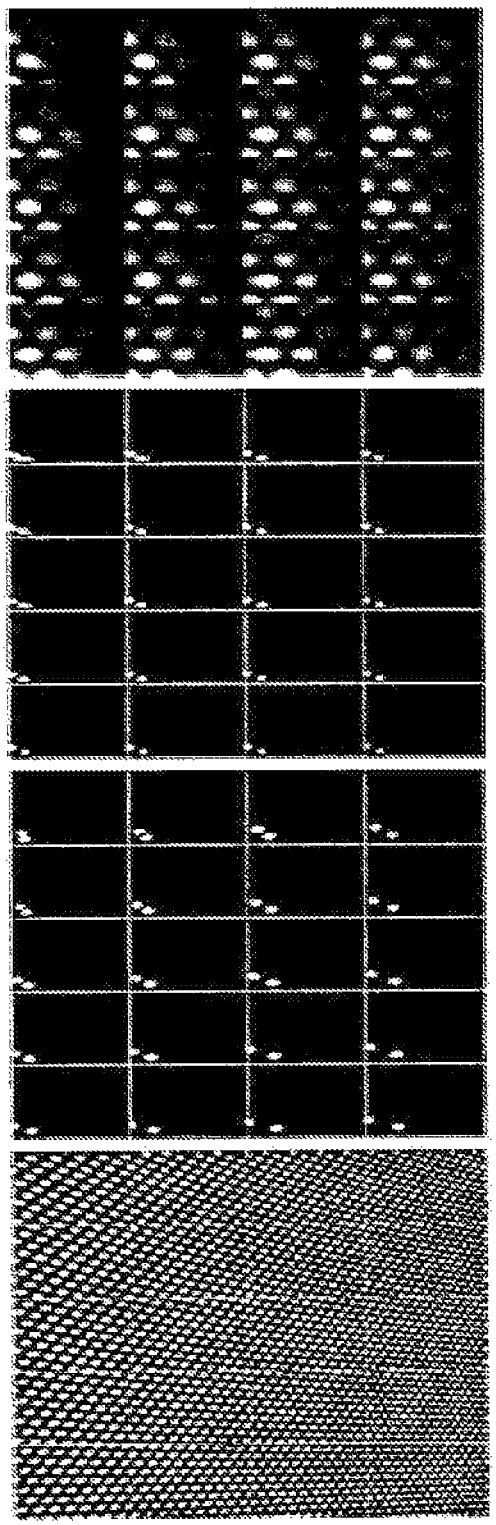
FIG. 5 schematically shows a sample textured plane which has been affinely distorted. From left-to-right: Affine distortion of a sample single-band image; FCT of the image patches in the left-hand panel, distortion-corrected power spectrums for the FCTs in the second panel and inverse FCTs for the power spectrum in the third panel.

Moreover, in FIG. 5, we show a sample textured plane which has been affinely distorted. In the figure, we have divided the distorted input texture into patches that are assumed to be locally planar. We then apply the FCT to each of these patches, represented in the form of a lattice on the input image in the left-hand panel. The corresponding power spectrums are shown in the second column of the figure. Note that, as expected, the affine distortions produce a displacement on the power spectrum peaks. In the third panel, we show the power spectrums after the matrix. Φ has been recovered and multiplied so as to obtain the corrected FCTs given by $F(\bullet)^*$. The distortion corrected textures in the spatial domain are shown in the right-most panel in the figure. These have been obtained by applying the inverse cosine transform to the power spectrums in the third column. Note that, from both, the corrected power spectrums and the inverse cosine transforms, we can conclude that the correction operation can cope with large degrees of shear in the input texture-plane patches.

Having presented our image descriptor in the previous sections, we now illustrate its utility for purposes of hyperspectral image categorisation. To this end, we employ a dataset of hyperspectral imagery acquired in-house using an imaging system comprised by an Acousto-Optic Tunable Filter (AOTF) fitted to a firewire camera. The system has been designed to operate in the visible and near infrared (NIR) spectral range.

Figure 6:
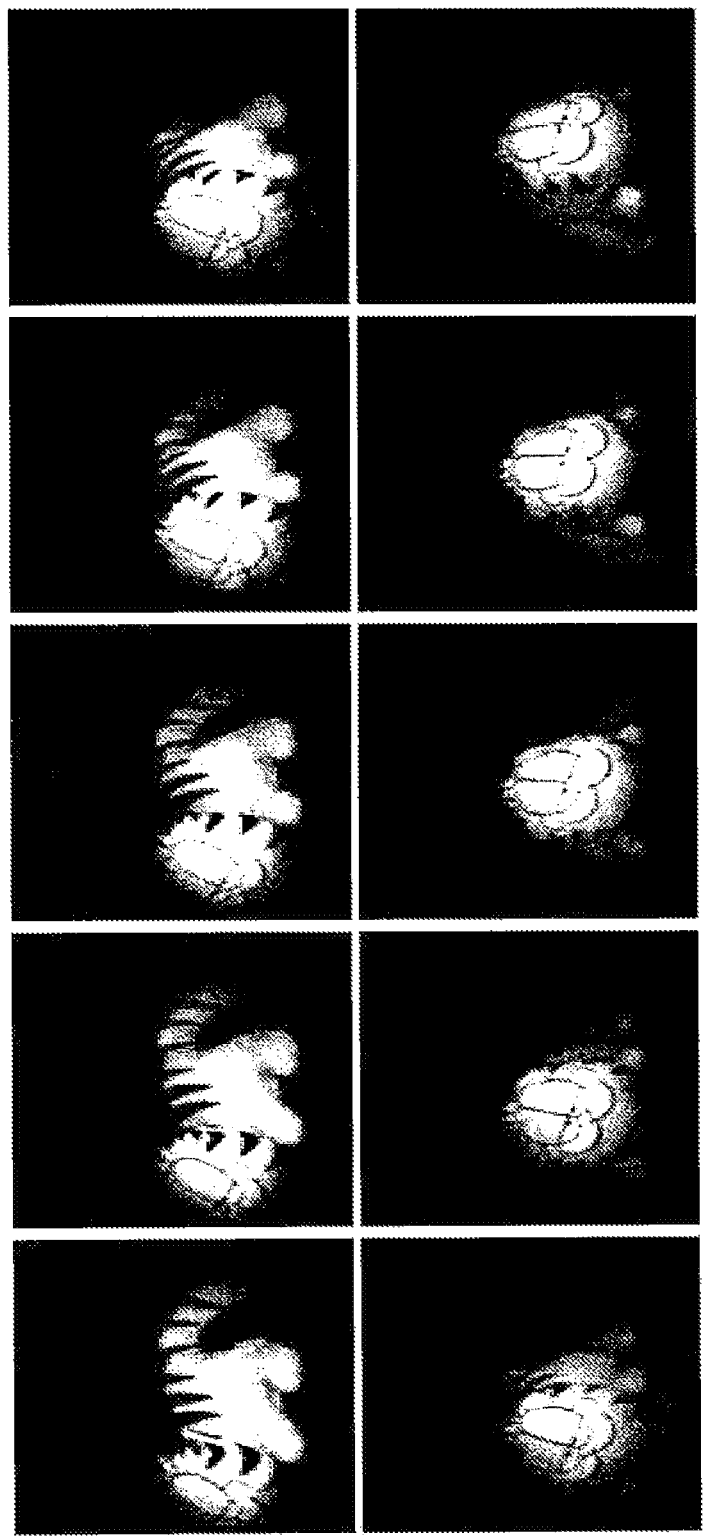
FIG. 6 shows a set of hyperspectral images of multiple viewpoints of an object in the fluffy toy category from our dataset. The toy sample was acquired over ten views by rotating the object in increments of 10° about its vertical axis.

In our dataset, we have images corresponding to five categories of toys and a set of coins. Each toy sample was acquired over ten views by rotating the object in increments of 10° about its vertical axis whereas coin imagery was captured only in two different views, heads and tails. FIG. 6 shows sample images over ten views of an object in the data set. In our database, there are a total of 62 toys and 32 coins, which, over multiple viewpoints yielded 684 hyperspectral images.

Figure 7:
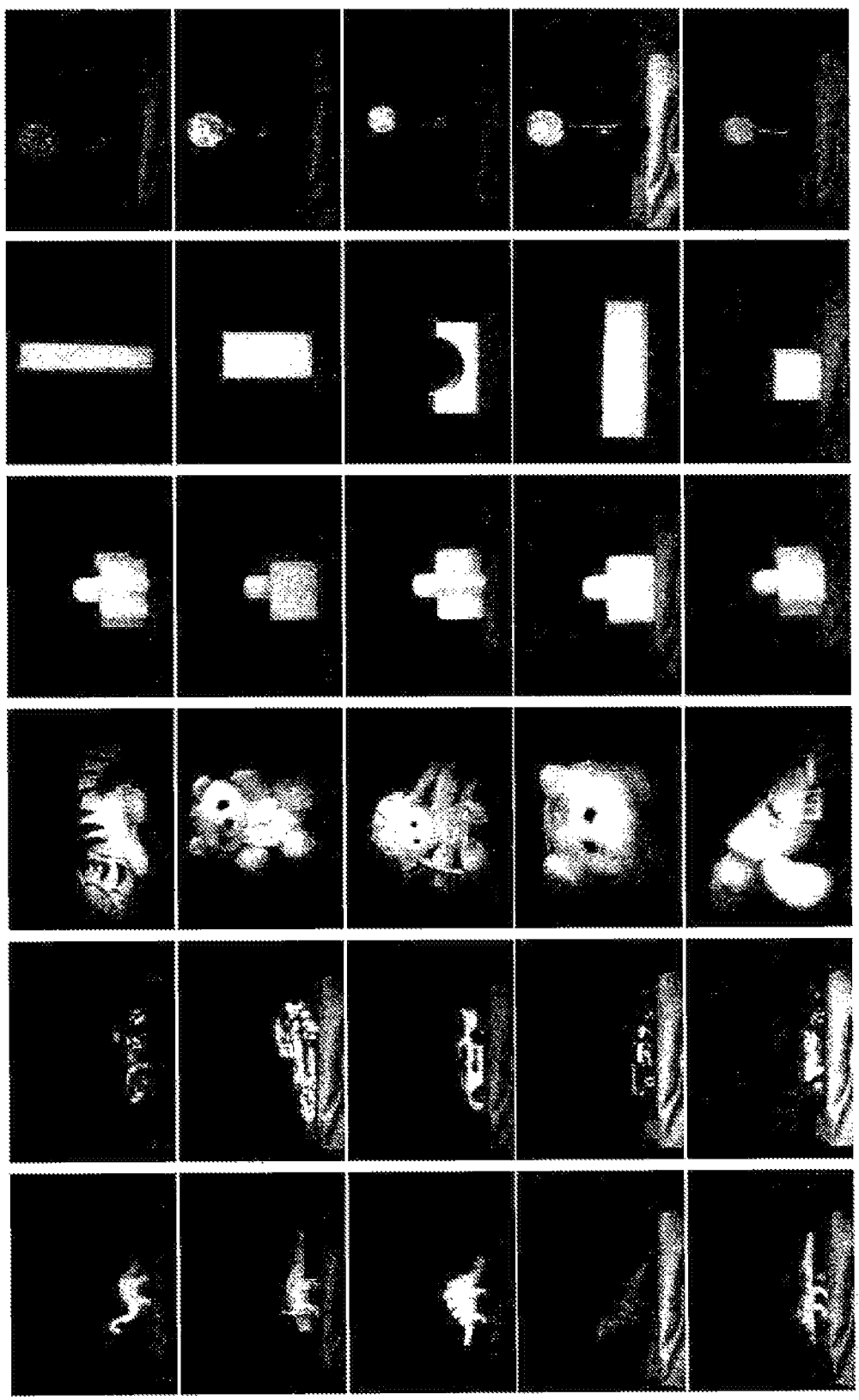
FIG. 7 shows a set of hyperspectral images of sample objects in each of the six categories from our dataset. These categories are, from left-to-right, plastic dinosaurs and animals, miniature cars, fluffy dolls, plastic blocks, wooden blocks and coins.

Each image is comprised of 51 bands for those wavelengths ranging from 550 to 1000 nm over 9 nm steps. For purposes of photometric calibration, we have also captured an image of a white Spectralon calibration target so as to recover the power spectrum of the illuminant across the scene. In FIG. 7, we show sample images in our dataset for five categories of toys and coins. In the figure, each column corresponds to one of our six categories.

In our experiments, our descriptors are used for recognition as follows. We first partition the imagery into two sets of equal size. One set is used for purposes of training, whereas the other is used as a testing data-base for purposes of recognition. The recognition task is performed by a k-nearest neighbour classifier [7] and a Support Vector Machine (SVM) [8]. For the SVM, we use a RBF kernel whose parameters have been obtained via cross validation.

Note that, to our knowledge, there is no hyperspectral image descriptors available in the literature. We compare our results with those yielded using the algorithm in [45]. The reasons for this are twofold. Firstly, this is a dynamic texture descriptor based upon local binary patterns (LBPs), which can be viewed as a local definition of texture and shape in the scene which combines the statistical and structural models of texture analysis. Secondly, from the results reported in [45], this method provides a margin of advantage over other alternatives in the dynamic texture literature. For the descriptors, in the case of the LBP method in [45], we have used a dimensionality of 1938 over the 51 bands in the images. For our descriptor, the dimensionality is 1500.

Figure 8:
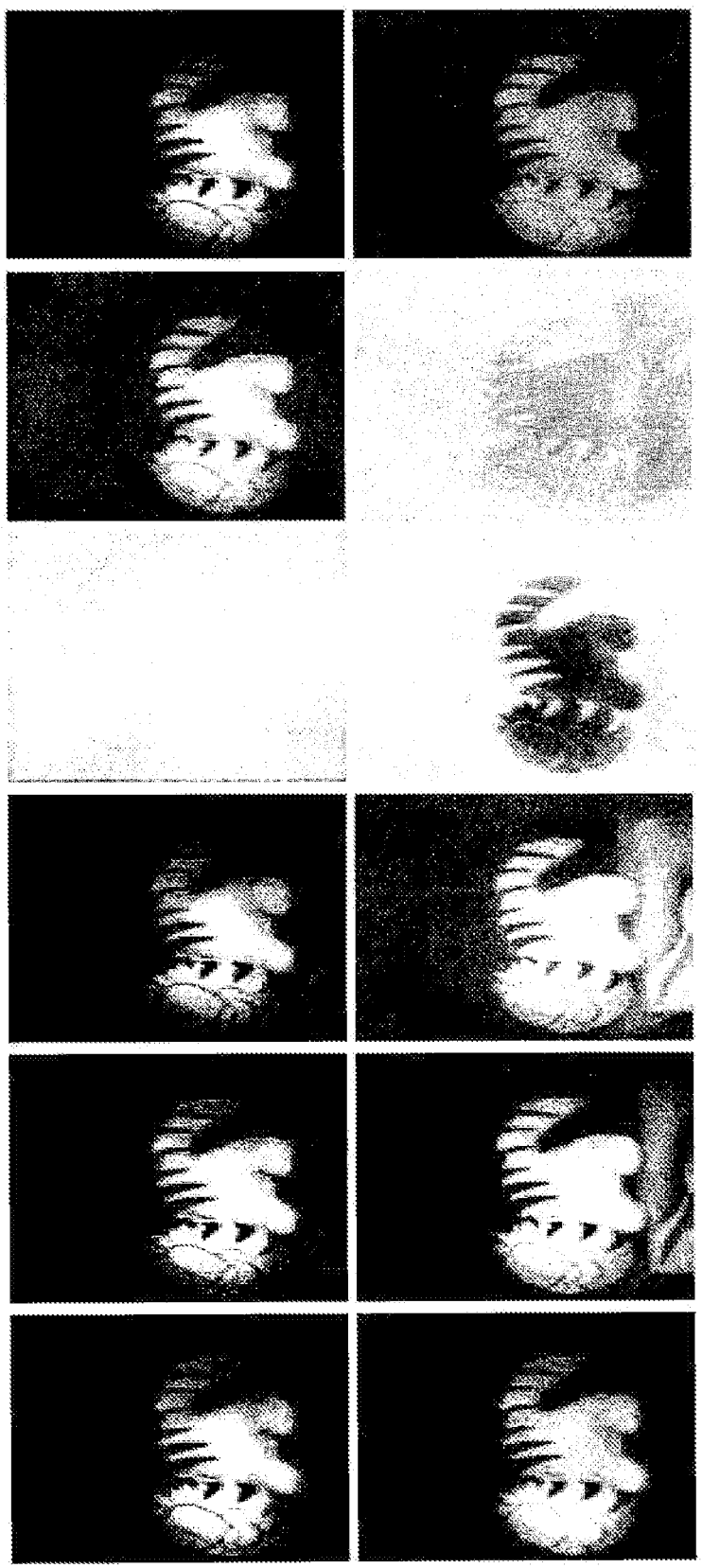
FIG. 8 shows hyperspectral image bands for an object. From left-to-right: sample hyperspectral images of a fluffy toy at a number of wavelength-resolved bands, i.e. $\lambda=\{550$ nm; 640 nm; 730 nm; 820 nm; 910 nm; 1000 nm$\}$. The top row shows the bands corresponding to the uncalibrated images and the bottom row shows the calibrated bands.

Since we have photometric calibration data available, in our experiments we have used two sets of imagery. The first of these corresponds to the dataset whose object images are given by the raw imagery. The second of these is given by the images which have been normalised with respect to the illuminant power spectrum. Thus, the first set of images corresponds to those hyperspectral data where the classification task is effected upon scene radiance, whereas the latter corresponds to a set of reflectance images. From now on, we denote the radiance-based set as the "uncalibrated" one, and the reflectance imagery as "calibrated". In FIG. 8, we show sample hyperspectral image bands for a fluffy toy at wavelengths corresponding to 550 nm, 640 nm, 730 nm, 820 nm, 910 nm, and 1000 nm. In the figure, the top row shows the uncalibrated imagery whereas the bottom row shows the calibrated data.

Figure 9:
FIG. 9 shows the partitioning of a sample spectral image. From left-to-right: 4, 16 and 64-squared image region partitioning of the fluffy toy image.

For purposes of recognition, we have computed our descriptors and the alternative making use of an approach reminiscent of the level-1 spatial histogram representation in [22]. This is, we have subdivided the images in a lattice-like fashion into 4, 16 and 64 squared patches of uniform size. In FIG. 9 we show the 4, 16 and 32-square lattice on the fluffy toy image. As a result, each image in either set, i.e. calibrated or uncalibrated, is comprised by 4, 16 or 64 descriptors. Here, we perform recognition based upon a majority voting scheme, where each of these descriptors is classified at testing time. Further, note that the fact that we have divided each image into 4, 16 and 64 squared regions provides a means to multiscale descriptor classification. Thus, in our experiments, we have used two majority voting schemes. The first of these limits the classification of descriptors to those at the same scale, i.e. number of squared regions in the image. The second scheme employs all the descriptors computed from multiple scales, i.e. 64+16+4 for every image.

In Tables 1.1-1.4 (FIGS. 10 to 13) we show the categorisation results for our dataset. In the tables, we show the results, per category and overall average, for the calibrated and uncalibrated data for both classifiers over the two schemes described above, i.e. multiscale and single-scale, when both, our method and the alternative are used to compute the image descriptors for the imagery. From the tables, its clear that our descriptor delivers better categorisation performance consistently for both classifiers. This is important since our descriptor has a lower dimensionality than the alternative. We can attribute this behaviour to the high information compaction of the FCT.

Also, note that for the nearest neighbour classifier, the overall results yielded using our method show no clear trend with respect to the use of reflectance, i.e. calibrated data, or radiance (uncalibrated imagery). This suggests that our method is robust to illuminant power spectrum variations. In the case of the SVM, the calibrated data with a multiscale approach delivers the best average categorisation results. For the alternative, the nearest neighbour classifier on uncalibrated data yields the best performance. Nonetheless, in average, absolute bests between the two descriptor choices here are 23% apart, being 75.63% for the LBP descriptor and 98.54% for our method. Further, note that for the coins, the alternative can be greatly affected by the effect of specularities at finer scales, i.e. the 64-region lattice. In contrast, our descriptor appears to be devoid of this sort of corruption.

This discussion of an example shows that a local hyperspectral image descriptor can be generated via harmonic analysis. This descriptor is invariant to affine transformations on the corresponding local planar object surface patch. The descriptor is computed using an integral transform whose kernel is harmonic in nature. Affine invariance is then attained by relating the local planar object surface patch to a plane of reference whose orientation is fixed with respect to the camera plane. We have shown how high information compaction in the classifier can be achieved by making use of an FCT. This method is general in that it can be applied to a number of harmonic kernels spanning a Hilbert space. This opens-up using other techniques available elsewhere in the literature, such as Mellin transforms, wavelets or Hankel transforms.

It will be appreciated by persons skilled in the art that numerous variations and/or modifications may be made to the invention as shown in the specific embodiments without departing from the scope of the invention as broadly described.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data streams along a local network or a publicly accessible network such as the internet.

It should also be understood that, unless specifically stated otherwise as apparent from the following discussion, it is appreciated that throughout the description, discussions utilizing terms such as "processing" or "computing" or "calculating", "optimizing" or "determining" or "displaying" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

REFERENCES

[2] Asmussen, S., Binswanger, K., and Hojgaard, B. (2000). Rare events simulation for heavy-tailed distributions. Bernoulli, 6(2):303-322.
[4] Bracewell, R. N., Chang, K.-Y., Jha, A. K., and Wang, Y.-H. (1993). Affine theorem for two-dimensional fourier transform. Electronics Letters, 29:304-309.
[7] Cover, T., and Hart, P. (1967). Nearest neighbor pattern classification. IEEE Transactions on Information Theory, 13(1):21-27.
[8] Cristianini, N., Shawe-Taylor, J., Elisseeff, A. and Kandola, J. (2001). On Kernel-Target Alignment. Advances in Neural Information Processing Systems, 14:367-373.
[9] Doretto, G., Chiuso, A., Wu, Y. N., and Soatto, S. (2003). Dynamic textures. International Journal of Computer Vision, 51(2):91-109.
[19] Katznelson, Y. (2004). An introduction to harmonic analysis, (Third Edition). Cambridge University Press.
[22] Lazebnik, S., Schmid, C. and Ponce, J. (2006). Beyond Bags of Features: Spatial Pyramid Matching for Recognizing Natural Scene Categories. In Proceedings of the 2006 IEEE Computer Society Conference on Computer Vision and Pattern Recognition, 2:2169-2178.
[25] Malik, J. and Rosenholtz, R. (1997). Computing Local Surface Orientation and Shape from Texture for Curved Surfaces. International journal of computer vision, 23(2): 149-168.
[34] Rao, K. R. and Yip, P. (1990). Discrete Cosine Transform: Algorithms, Advantages, Applications. Academic Press Professional, Inc., San Diego. 24
[35] Ribeiro, E. and Hancock E. R. (2001). Shape from periodic texture using the eigenvectors of local affine distortion. IEEE Transactions on Pattern Analysis and Machine Intelligence, 23(12):1459-1465.
[40] Sneddon, I. N. (1995). Fourier Transforms. Dover, N.Y.
[41] Stein, E M and Weiss, G. (1971). Introduction to Fourier Analysis on Euclidean Spaces. Princeton University Press.
[44] Young, N. (1988). An introduction to Hilbert space. Cambridge University Press.
[45] Zhao, G. and Pietikainen, M. (2007). Dynamic texture recognition using local binary patterns with an application to facial expressions. IEEE Transactions on Pattern Analysis and Machine Intelligence, 29(6):915-928.

The invention claimed is:

1. A non-transitory machine-readable medium that provides instructions, which when executed by a computer cause the computer to generate a descriptor of a hyperspectral or multispectral image comprised of wavelength indexed radiance measurements, by performing operations comprising:
for a set of wavelength indexed bands, computing a band representation of the radiance measurements for that band based on a probability distribution function;
computing a wavelength-dependent cross-correlation between the band representations; and
computing a descriptor based on the computed cross-correlation between the band representations.

2. The operations of claim 1, wherein computing a band representation is based on one or more probability distribution functions.

3. The operations of claim 1, wherein the probability distribution function has a long and/or heavy tail.

4. The operations of claim 1, wherein computing a band representation based on a probability distribution function is further based on a harmonic kernel or function.

5. The operations of claim 4, wherein the harmonic function or kernel is one or more of:
Mellin
Hankel
Cosine, and
Eigenvalues and eigenvectors.

6. The operations of claim 5, further comprising using the descriptor in post processing of the image, where the harmonic function or kernel used is based on the type of post processing to be performed.

7. The operations of claim 4, wherein the method further comprises removing distortion from the harmonic function or kernel induced by geometric transformations of the image as represented in the band representations.

8. The operation of claim 7, wherein removing distortion includes determining the relationship between the geometric transformations over locally planar patches on the surfaces in the scene captured in the image and its effect on the band representations.

9. The operations of claim 1, wherein computing the cross-correlation comprises an approximation over the band representations based on a probability distribution function.

10. The operations of claim 9, wherein the approximation over the band representations is further based on a harmonic function or kernel.

11. The operations of claim 7, wherein computing the cross-correlation comprises an approximation over the band representations having distortion removed and based on a further probability distribution function.

12. The operations of claim 1, wherein the descriptor comprises a vector whose elements correspond to the cross-correlation between the band representations.

13. The operations of claim 1, wherein computing the band representations and cross-correlation is performed on multiple regions of the image.

14. The operations of claim 1, further comprising using the descriptor in post processing of the image.

15. The computer operations of claim 14, wherein post-processing of the image includes one or more of:
image editing;
recognition;
classification, and
localization.

16. A computer system for generating a descriptor of a hyperspectral or multispectral image comprised of wavelength indexed radiance measurements, comprising:
a sensor for capturing a hyperspectral or multispectral image; and
a processor, for a set of wavelength indexed bands, generating a band representation of the radiance measurements for that band based on a probability distribution function, calculating a wavelength-dependent cross-correlation between the band representations, and generating a descriptor based on the computed cross-correlation between the band representations.

* * * * *